Sept. 16, 1952 E. W. MARLOWE 2,611,075

CARRIER INDUCTIVE COMMUNICATION SYSTEM FOR VEHICLES

Filed April 24, 1947 4 Sheets-Sheet 1

INVENTOR.
Elbert W. Marlowe.
BY
HIS ATTORNEY

INVENTOR.
Elbert W. Marlowe
BY
[signature]
HIS ATTORNEY

CARRIER INDUCTIVE COMMUNICATION SYSTEM FOR VEHICLES

Filed April 24, 1947 4 Sheets-Sheet 3

INVENTOR.
Elbert W. Marlowe.
BY [signature]
HIS ATTORNEY

Sept. 16, 1952 E. W. MARLOWE 2,611,075

CARRIER INDUCTIVE COMMUNICATION SYSTEM FOR VEHICLES

Filed April 24, 1947 4 Sheets-Sheet 4

INVENTOR.
Elbert W. Marlowe.
BY [signature]
HIS ATTORNEY

Patented Sept. 16, 1952 2,611,075

UNITED STATES PATENT OFFICE 2,611,075

CARRIER INDUCTIVE COMMUNICATION SYSTEM FOR VEHICLES

Elbert W. Marlowe, Wilkinsburg, Pa., assignor to Westinghouse Air Brake Company, a corporation of Pennsylvania Application April 24, 1947, Serial No. 743,681

6 Claims. (Cl. 246—8)

Figure 1A:
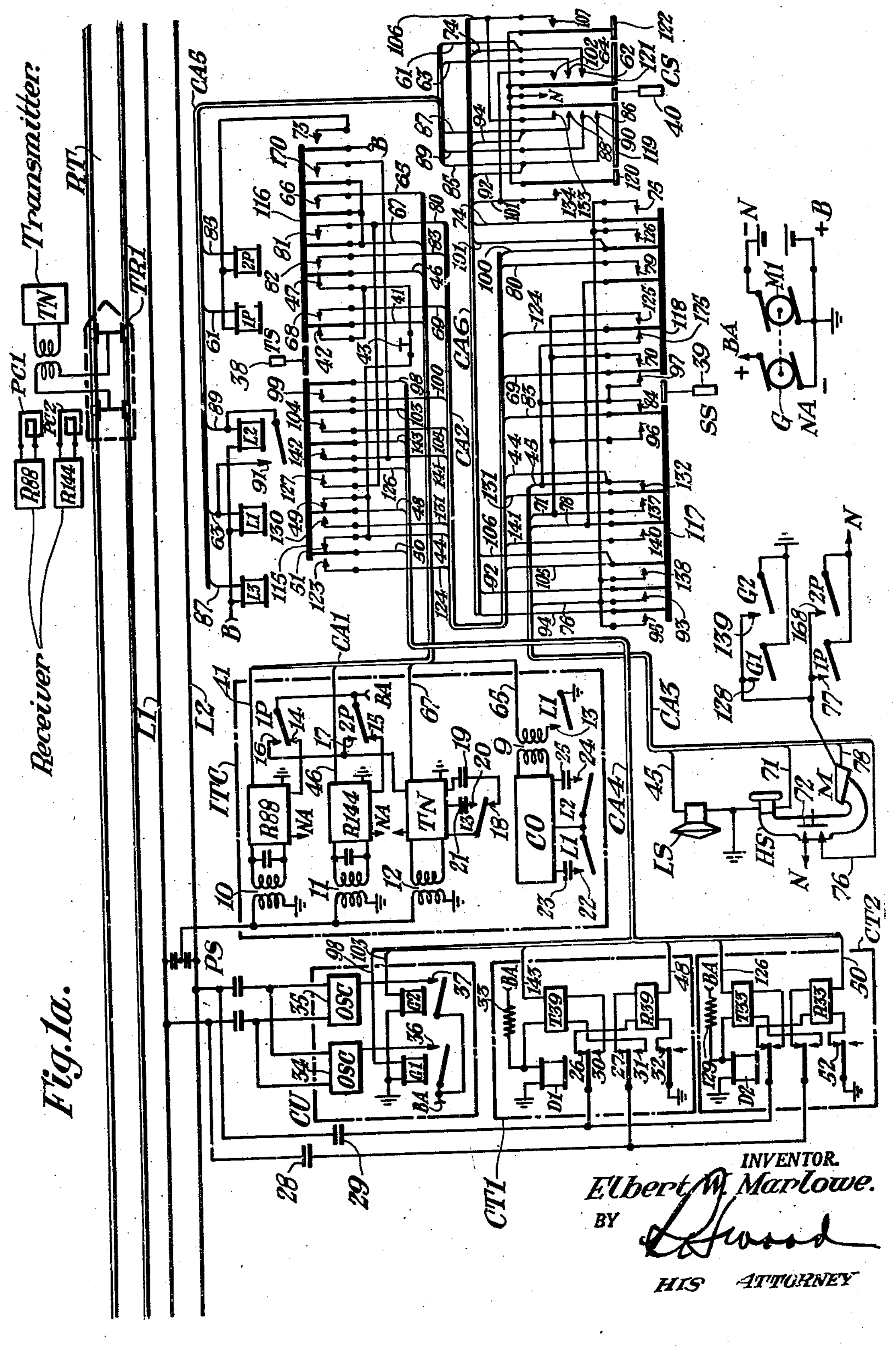

My invention relates to carrier inductive communication system for vehicles, and more particularly to communication systems for railway trains.

In communication systems for moving vehicles ths transmission must be restricted pretty much to a narrow zone along the trackway to minimize interference with broadcasting and other services, and to this end carrier induction systems have been used. In such carrier induction systems the distance dependable communication can be had between a wayside station and a vehicle en route is ordinarily much less than the length of the trackway involved. For example, in carrier telephone systems for railway trains dependable communication between a wayside station and a train is usually confined to a distance of the order of 30 miles, whereas the stretch of track involved may be an entire division of 100 to 200 miles. The range of transmission of the communication current is limited in part to the fact that the energy level of the power that may be supplied by a transmitter to a line circuit has been limited by a so-called low power rule.

In a preferred form of inductive carrier communication system, the longitudinal circuit of a line wire, or better, of a pair of line wires, extending parallel to and relatively close to the vehicle trackway is included in a transmitting channel which is inductively associated with vehicle carried circuit elements for transfer of energy between the vehicle apparatus and the wayside. In inductive carrier telephone systems for railway trains, the track rails and the line wires mounted on a pole line along the right-of-way are elements of a transmitting channel due to the distributed impedance of the rails to ground, the distributed capacitance of the line wires to ground, and the distributed inductance between the rails and the line wires. At a wayside station the telephone apparatus is coupled to the transmitting channel by being coupled to the longitudinal circuit of a pair of line wires, or of a single line wire and ground. In view of the so-called low power rule mentioned hereinbefore, the magnitude of the communication energy that may be supplied to the line wires can be relied upon to provide dependable communication for only a limited distance. Such limited range of transmission makes it necessary to provide some arrangement to extend the range to the more remote points of the stretch of track.

Accordingly, a main object of my invention is the provision of a carrier inductive communication system incorporating novel and improved means to extend the range of communication between a wayside station and vehicles en route.

Another object of my invention is the provision of a carrier inductive communication system incorporating novel means to operate two or more wayside stations spaced apart from a single office location, and an operator at the office can use the apparatus of the wayside station in the vicinity of the vehicle with which he wishes to communicate.

Again, a feature of my invention is the provision of improved push-to-talk control of two-way carrier telephone apparatus of a wayside station from a remote office.

A more specific feature of my invention is the provision of improved means to control a two-channel two-way telephone equipment of a wayside station of a railway train telephone system from a remote office.

Another feature of my invention is the provision of improved control means wherewith an operator at an office can selectively communicate with trains in the vicinity of the office through apparatus local to the office, or communicate with trains in the vicinity of a remote wayside station through telephone apparatus located at the remote station.

Other features, objects and advantages of my invention will appear as the specification progresses.

The foregoing objects, features and advantages of my invention I attain by the use of a pair of line wires along the stretch of trackway involved, and which line wires can be arranged in both a longitudinal and a transverse circuit. The line wires in multiple with their distributed capacitance and conductance to ground form a longitudinal circuit, and the two line wires in series form a transverse circuit. These line wires are disposed parallel to and relatively near the vehicle trackway and the longitudinal circuit is inductively associated with vehicle carried circuit elements for the transfer of energy between the vehicle apparatus and the wayside transmitting channel. An office or primary station and one or more remote or secondary stations are located at preselected points along the trackway, the spacing between the stations being such that communication between a station and vehicles can be had for a distance of somewhat more than half the distance between two stations. Generally speaking the distance between the office and a remote station would be of the order of 50 miles, but the invention is not limited to such arrangement and other spacing of the office and remote station can be employed. Each station is provided with a No. 1 and a No. 2 carrier telephone equipment. The No. 1 equipment cooperates with the longitudinal circuit of the line wires for communication with vehicles, and the No. 2 equipment cooperates with the transverse circuit of the line wires for transmission of telephone current between the office and the remote station.

The No. 1 equipment is of the simplex type including a push-to-talk switch and preferably it is a two carrier channel arrangement to communicate on either of two carrier frequencies so as to permit one vehicle breaking in on the conversation between the station and another vehicle in case of an emergency condition. It is apparent, however, that the invention can be used with a single carrier channel system. The No. 2 telephone equipment is of the simplex type using one of two carriers. The office or primary station is attended and the operator controls the No. 1 equipment of the office by a local switching means and the No. 1 equipment at the secondary or remote station through the No. 2 equipments of the two stations. That is, for telephoning to vehicles within the range of transmission of the primary station, the operator uses the No. 1 equipment of the primary station, and for telephoning to vehicles within the range of transmission of the remote station the operator uses the No. 2 equipments for transmitting between the two stations and the No. 1 equipment at the remote station for transmitting to the vehicles.

Push-to-talk and control features at the remote station are handled by the operator at the primary station by control currents transmitted between the two stations through the line circuit, the control currents having characteristics different from the telephone currents.

I shall describe two forms of apparatus embodying my invention and shall then point out the novel features thereof in claims.

Figure 1B:
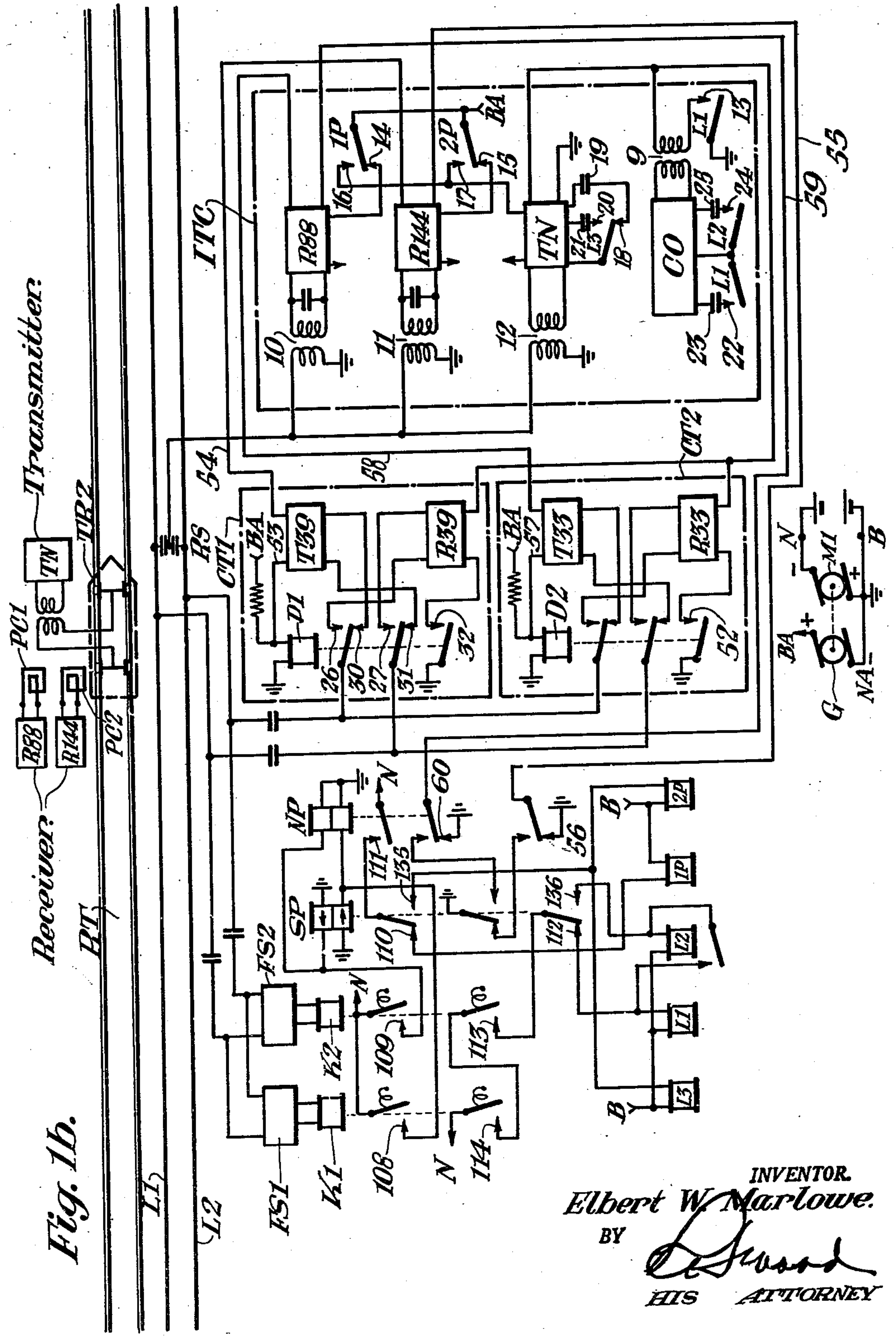
Figure 2A:
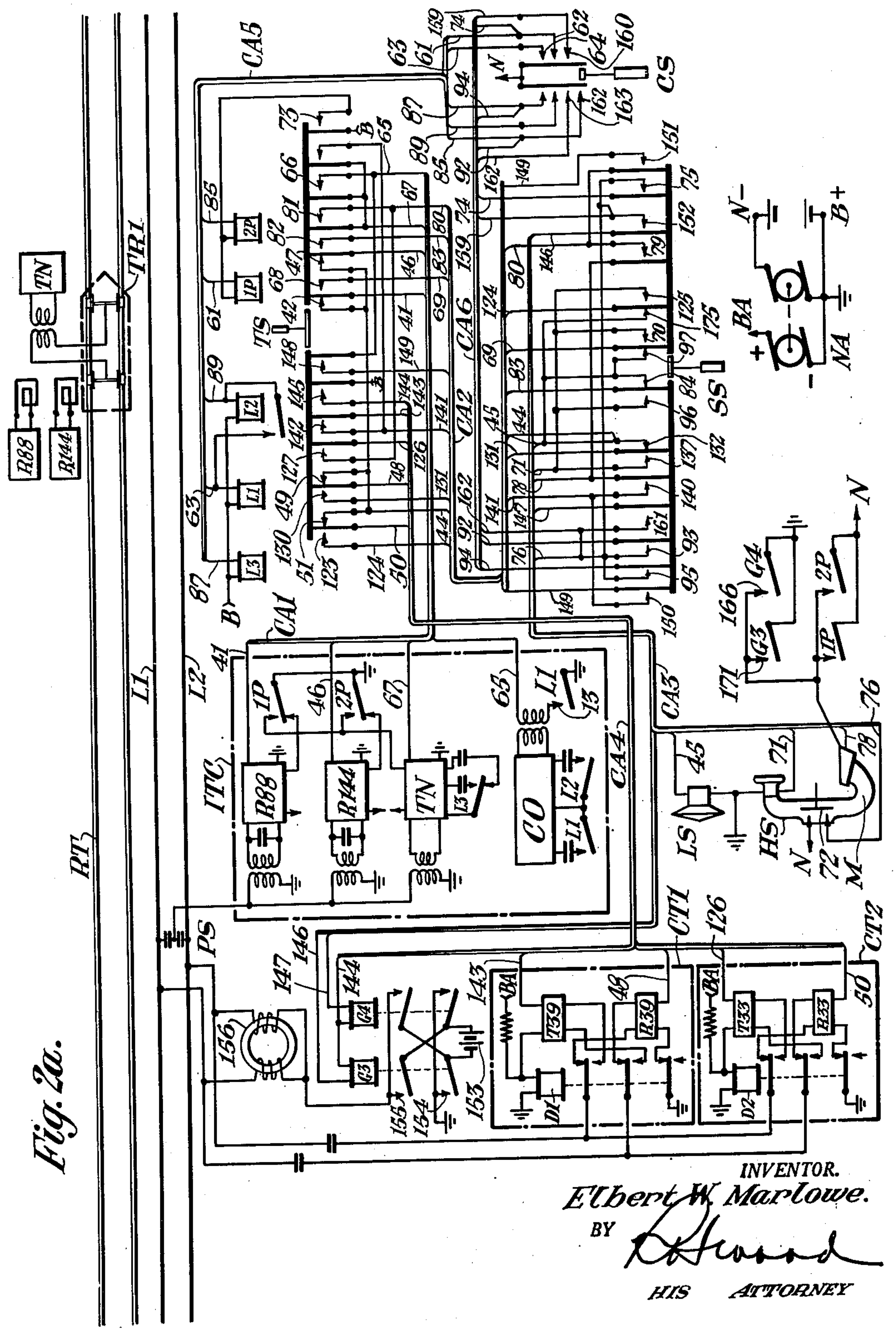
Figure 2B:
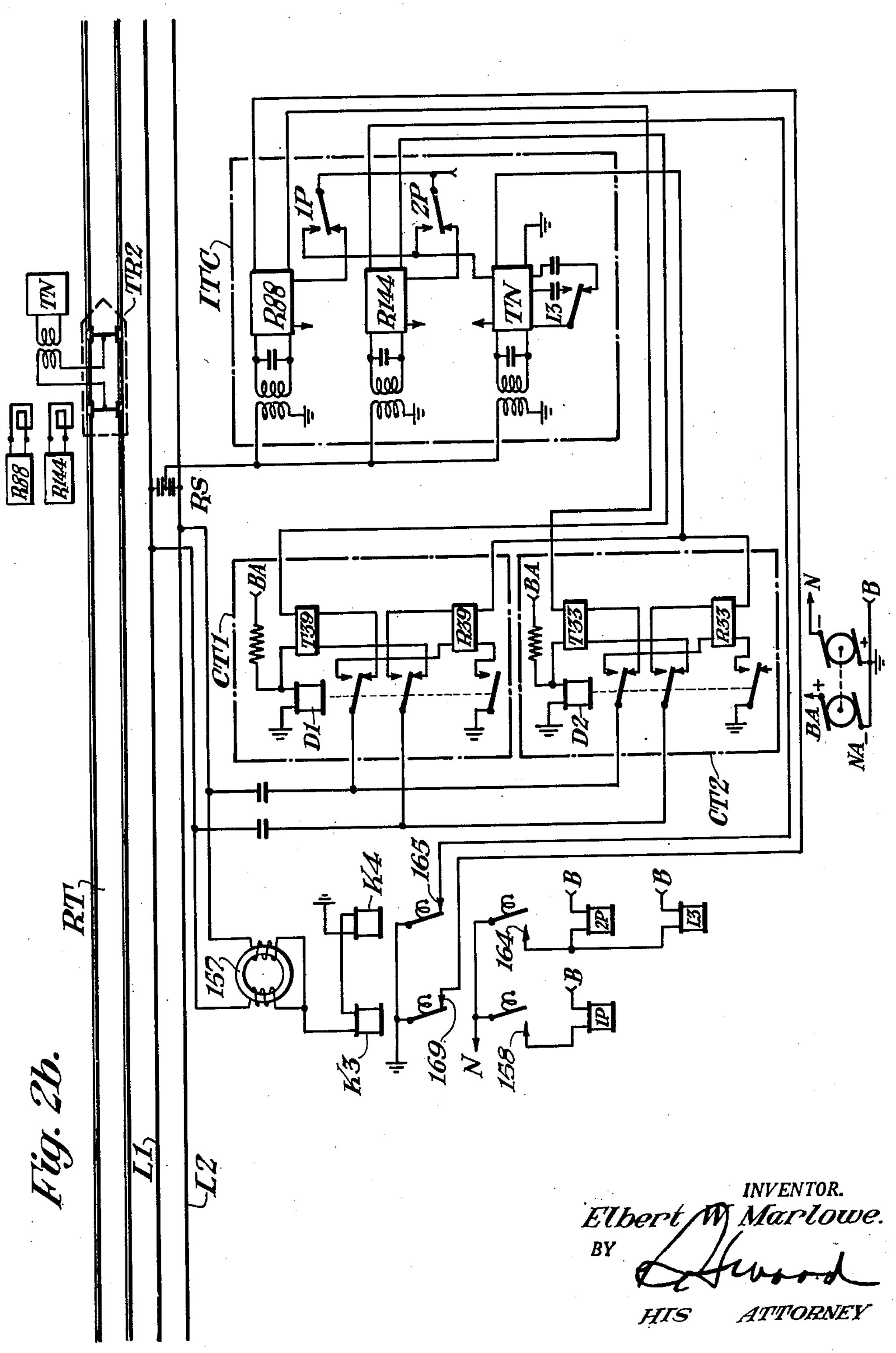

In the accompanying drawings, Figs. 1*a* and 1*b* when taken together with Fig. 1*a* at the left are diagrammatic views showing one form of apparatus embodying my invention when used with a telephone system for railway trains, and wherewith the control currents are of different frequencies. Figs. 2*a* and 2*b* when taken together with Fig. 2*a* at the left are diagrammatic views showing a second form of apparatus embodying my invention when used with a railway train telephone system and wherewith polarized line circuits are used for control.

In the different views like reference characters are used to designate similar parts.

It is to be understood that the invention is not limited to a railway train telephone system, and this one application serves to illustrate the many places the apparatus is useful.

Referring to Figs. 1*a* and 1*b*, the reference character RT designates a railway track which may be a continuous stretch or two independent stretches, and to aid in the understanding of the invention I shall consider it is a single stretch of track of a length of the order of 60 miles. Two trains indicated conventionally at TR1 and TR2 are illustrated as operating over this stretch of track, the train TR1 being considered at some point within 30 miles from the left-hand end, and the train TR2 being considered as operating at some point within 30 miles from the right-hand end.

An office or primary station PS is located near the left-hand end of this stretch of track and a secondary or remote station RS is located along the stretch, the arrangement being such that the primary and secondary stations are spaced approximately 50 miles apart although other arrangements and spacing of the office and remote station can be used.

The reference characters L1 and L2 designate a pair of line wires extending along the track RT. These line wires may be carried on the usual pole line along the railway right-of-way. That is, the line wires L1 and L2 are parallel to and relatively near to the track RT throughout the entire stretch of track. The line wires L1 and L2 are capable of being used in both a longitudinal and a transverse circuit. These wires may be wires used in an existing circuit and are used in the inductive carrier telephone system as an additional service without interference with their present use. The line wires L1 and L2 may be installed for the carrier telephone system alone.

Both the primary station PS and the secondary station RS are provided with apparatus for telephone communication with trains operating on the track RT. This apparatus is of the inductive carrier type and each apparatus includes a No. 1 and a No. 2 equipment or assembly, together with control and switching means and suitable sources of power.

The No. 1 assembly is indicated as a whole by a dot and dash rectangle ITC at each station and each assembly is capable of communication with trains within a given range of the respective station. Each ITC assembly is of the two channel type capable of communicating on either a first or a second carrier frequency, such as a carrier frequency of 88 kc. and 144 kc., respectively, although other carrier frequencies can be used. As here shown, each ITC assembly includes two independent receivers and a transmitter. One receiver designated R88 is for use with the first carrier channel of 88 kc. and the other receiver designated R144 is for use with the second carrier channel of 144 kc. The transmitter designated TN is capable of being conditioned to supply current of either the first or second carrier frequency. These devices may take different known forms, and are shown conventionally for the sake of simplicity. These devices may, for example, be similar to those disclosed in an application for Letters Patent of the United States, Serial No. 575,311, filed January 30, 1945, by Paul N. Bossart, for Railway Train Communication Systems, now Patent No. 2,484,680, issued October 11, 1949. It is sufficient for the present application to point out that the receivers R88 and R144 have their input coupled in multiple to the longitudinal circuit of the line wires L1 and L2 through transformers 10 and 11, respectively, and the output of the transmitter TN is coupled to the longitudinal circuit through a transformer 12. The two receivers R88 and R144 are normally conditioned for reception, and the transmitter TN is normally inactive and energized and made active only during the sending from the respective station.

As here shown, the power source at each station includes a motor generator, a motor M1 of which is powered from a low voltage direct current source, such as a 32 volt battery having terminals B and N, and a generator G of which supplies a relatively high voltage suitable for energizing the anode circuits of the various electron tubes of the different devices as will appear from time to time. The terminals of the generator G are indicated at BA and NA, the negative terminal NA and the positive terminal B of the low voltage source being preferably connected to ground. In several instances, relay contacts are shown in the drawings remote from the relay winding for the sake of simplicity. In each case the contact is given the reference character of the respective relay plus a distinctive numeral.

To normally condition the receivers for reception, the anode circuits of the tubes of the receivers are normally connected to the generator G. The anode circuits for the receiver R88 include back contact 14 of a power relay 1P, to be referred to later, and the anode circuits for the receiver R144 include back contact 15 of a power relay 2P, also to be referred to later. The transmitter TN is energized from generator G when relay 1P is picked up closing front contact 16 and also when relay 2P is picked up closing front contact 17. The transmitter TN is conditioned to supply the carrier of 88 kc. when a relay L3, to be referred to later, is released to close back contact 18 and a capacitor 19 is interposed in the associated oscillator circuit, but when relay L3 is picked up closing front contact 20, a capacitor 21 is interposed in the oscillator circuit and the transmitter is conditioned to supply the carrier current of 144 kc.

Each ITC assembly also includes a calling oscillator CO adaptable of generating an individual tone frequency for each of the carrier frequency channels. The oscillator CO may be a standard form oscillator and it is shown conventionally. It is normally active and it is conditioned to supply the tone frequency for the first or 88 kc. channel when a relay L1 is picked up closing front contact 22 to include a capacitor 23 in the oscillating circuit and it is conditioned to supply a tone frequency for the second or 144 kc. channel when relays L1 and L2 are both picked up closing contacts 22 and 24, respectively, to interpose capacitors 23 and 25 in the oscillating circuit. The output of the calling oscillator CO is coupled to the associated transmitter TN to modulate the carrier frequency by the respective tone frequency, a transformer 9 and a front contact 13 of relay L1 being included in a coupling circuit to be more completely explained hereinafter.

The No. 2 telephone equipment at each station comprises two carrier telephone units designated CT1 and CT2, respectively. These units are alike except for the carrier frequency used and a description of one is sufficient for an understanding of all. To aid in the understanding of the invention, I shall assume that the unit CT1 uses a carrier frequency of 39 kc. and the unit CT2 uses a carrier frequency of 33 kc., although other frequencies can be used. Looking at the unit CT1 at the station PS, it includes a transmitter T39, a receiver R39 and a switching relay D1. The transmitter T39 and receiver R39 are shown in block form because they can be of standard arrangement. These units may be of a structure similar to that disclosed in an application for Letters Patent of the United States, Serial No. 655,071, filed March 18, 1946, by Ralph K. Crooks, for Communication Apparatus, now Patent No. 2,432,560, issued December 16, 1947. It is sufficient for this application to point out that the transmitter T39 includes an oscillator of a carrier frequency and means for modulating the carrier by voice frequencies. Also, the receiver R39 includes a demodulator of such carrier telephone current.

The relay D1 governs the connections of the transmitter T39 and the receiver R39 to the transverse circuit of the line wires L1 and L2, the arrangement being such that when relay D1 is picked up closing front contacts 26 and 27, the input side of receiver R39 is connected across the line wires L1 and L2 through blocking capacitors 28 and 29, and when relay D1 is released opening front contacts 26 and 27 and closing back contacts 30 and 31 the receiver R39 is disconnected from the line circuit and the output of the transmitter T39 is connected thereto. The output of the receiver R39 is also controlled at front contact 32 of relay D1, as will be explained shortly. The relay D1 at station PS is normally energized by current supplied from the generator G through a resistor 33. To effect a release of relay D1, its winding is shunted at times by a low impedance input circuit of the transmitter T39, as will be explained hereinafter.

The unit CT2 at station PS is the same except its transmitter T33 and receiver R33 are adapted for using the lower carrier of 33 kc.

At the remote station RS, the two carrier telephone units CT1 and CT2 are coupled to the transverse line circuit to cooperate with the corresponding units at the primary station PS. That is, the two CT1 units cooperate for transmitting a carrier telephone current of the carrier of 39 kc. between the two stations and the two CT2 units cooperate to transmit carrier telephone current of the carrier 33 kc. between the two stations. It is to be pointed out that the two control relays D1 and D2 at the remote station RS are normally shunted and released so that the associated transmitters are connected to the transverse line circuit.

The apparatus at the remote station RS is governed by the operator at the primary station PS by means of control currents of different frequencies transmitted between the two stations by the transverse line circuit. At the primary station PS a control unit CU is provided with two oscillators indicated conventionally at 34 and 35, the oscillator 34 supplying a first control current of a frequency of say $f1$ and the oscillator 35 supplying a second control current of a frequency of say $f2$. These frequencies $f1$ and $f2$ are preselected and are made different from any of the carrier frequencies used in the telephone communication system. The arrangement is such that when a control relay G1 is energized closing front contact 36, the oscillator 34 is powered from generator G and control current of the frequency $f1$ is applied to the line circuit and when a control relay G2 is energized closing front contact 37, the oscillator 35 is powered and control current of the frequency $f2$ is supplied to the line circuit. At the remote station RS two control frequency selectors FS1 and FS2 are connected in multiple across the line wires. These devices FS1 and FS2 are shown in block form since they can be of standard form, the selector FS1 including a filter and a rectifier to energize a relay K1 in response to control current of the frequency $f1$, and the selector FS2 including a filter and a rectifier to energize a relay K2 in response to control current of the frequency $f2$.

The relays K1 and K2 are preferably of the bias polar type, the arrangement being such that their armatures are biased to the right-hand position, that is, the position shown in the drawing, and their armatures are operated to the left-hand position when the relay is energized by the current supplied through the respective selector. A stick polar relay SP and a neutral relay NP are associated with the relays K1 and K2 to govern the operation of the remote station apparatus, as will be explained when the operation of the apparatus is described.

A group of call selector relays L1, L2, and L3 and two power supply relays 1P and 2P are provided at each station, the function of which relays will also appear when the operation of the apparatus is described.

The operator at the primary station PS governs the operation of the apparatus at the station PS and also at the remote station RS through the medium of a transfer switch TS, a channel selector switch SS and a calling switch CS. These switches are shown as of the three-position multiple contact type. The transfer switch TS, for example, is operated to a center or stand-by position, a left-hand or remote control position and a right-hand or local control position by movement of its handle 38 to a center, a left-hand, and a right-hand position, respectively. The construction is such that when the handle 38 is moved to the left, a contact actuating member 115 of suitable insulating material is moved to the left and a contact actuating member 116 also of insulating material remains in the position it is shown in the drawing, but when the handle 38 is moved to the right, member 116 is moved to the right and the member 115 is left in the position shown.

Similarly, the channel selector switch SS is operated to a stand-by position, a high carrier channel position and a low carrier channel position by movement of its handle 39 to a center, a left-hand, and a right-hand position, respectively. The construction is such that the handle 39 when moved to the left actuates a contact actuating member 117 of insulating material to the left, leaving an insulation contact actuating member 118 stationary and when handle 39 is moved to the right, the member 118 is moved to the right but the member 117 is left stationary.

An inactive condition of the calling switch CS is effected when its handle 40 is set at a center position, a high channel calling condition is effected when the handle 40 is moved to the left, and a low channel calling condition is effected when the handle 40 is moved to the right. The construction is such that handle 40 when moved to the left first moves a contact actuating member 119 and then a contact actuating member 120, leaving two other contact actuating members 121 and 122 stationary. A movement of the handle 40 to the right first causes movement of contact actuating member 121 and then movement of member 122, leaving members 119 and 120 stationary.

At the primary station PS the circuit wires between the several devices are shown run in cables in order to simplify the drawing. Each circuit wire is identified by a numeral placed at each end of the wire.

Each train TR1 and TR2 is provided with two-way communication apparatus adapted to cooperate with the ITC assemblies of the wayside stations through the trackway transmitting channel which includes the longitudinal circuit of the line wires. This transmitting channel is explained more fully in Letters Patent of the United States, No. 2,064,642, granted December 15, 1936, to Paul N. Bossart for Railway Train Communication Systems. The apparatus of each train preferably includes a transmitter TN and two receivers R88 and R144 similar to the corresponding devices at the wayside stations. Each train carried transmitter TN is coupled to a sending circuit having connection to two pairs of spaced wheels of the train so that communication current supplied by the transmitter flows in the rails between the two pairs of wheels and a corresponding voltage is developed across this length of the rails. This voltage causes current to flow in a circuit including the rails each side of the train and the distributed rail to ground impedance. Energy is transferred to the line wires due to the distributed inductance of the line wires and rails and also by the mutual inductance between the sending circuit on the train and the line wires and communication current flows in the longitudinal circuit of the line wires. The train carried receivers R88 and R144 are connected to pick-up coils PC1 and PC2, respectively, and each of which coils is mounted for inductive relation with the trackway transmitting channel. Thus, carrier communication current supplied to the transmitting channel to flow therein causes a transfer of energy to the train carried receivers.

In describing the operation of the apparatus of Figs. 1*a* and 1*b*, I shall first consider the stand-by condition, that is, the condition during non-communication and in which condition the apparatus is illustrated in the drawings. In this stand-by condition, the two receivers R88 and R144 of the ITC assembly at each station are energized and the transmitter TN is inactive.

Looking at the primary station PS, the receivers R88 and R144 have their outputs normally connected in multiple to a loud-speaker LS. The output circuit of the receiver R88 can be traced from the upper right-hand terminal of the receiver through wire 41 in cable CA1, normally closed contact 42 of transfer switch TS, a test switch 43, wire 44 in cable CA2 to a terminal of switch SS, wire 45 in cable CA3, loud-speaker LS and through the ground path back to the other side of the output of receiver R88. The output side of receiver R144 extends through wire 46 in cable CA1, contact 47 of switch TS, test switch 43 and thence to the loud-speaker, as traced for the receiver R88, and back to receiver R144 through the ground path.

Both receivers R39 and R33 of the carrier telephone units CT1 and CT2 at station PS are energized and their outputs connected to the loud-speaker LS in multiple with the receivers R88 and R144. The output of the receiver R39 includes wire 48 in cable CA4, normally closed contact 49 of switch TS, wire 44 in cable CA2, wire 45 in cable CA3, loud-speaker LS, ground and front contact 32 of relay D1. Similarly, the output of receiver R33 extends through wire 50 in cable CA4, a normally closed contact 51 of switch TS, and thence to the loud-speaker as previously traced and through the ground and front contact 52 of relay D2. It follows that during the stand-by condition a calling current or a telephone current received at the station PS from the longitudinal line circuit is demodulated at receiver R88 or R144 as the case may be and the calling tone or message is sounded at the loud-speaker. Also, any calling current or telephone current of the carrier 39 kc. or 33 kc. received at station PS from the transverse line circuit is demodulated at receiver R39 or R33 as the case may be, and the corresponding calling tone or message sounded at the loud-speaker.

Under the stand-by condition of the apparatus at the remote station RS, the relay D1 of the unit CT1 is shunted by a path including wire 53, low impedance input of transmitter T39, wire 54, low impedance output of receiver R144, wire 55, back contact 56 of relay NP and ground; and the relay D2 of the unit CT2 is shunted by a similar path including wire 57, low impedance input of transmitter T33, wire 58, low impedance output of receiver R88, wire 59, back contact 60 of relay NP and ground. With relays D1 and D2 shunted, the outputs of the transmitters T39 and T33 are coupled to the transverse line circuit. Thus a calling current of the low or 88 kc. carrier channel received from the longitudinal circuit at station RS is demodulated at receiver R88 and the tone frequency is applied to the transmitter T33 to modulate the 33 kc. current and the output of transmitter T33 is applied to the transverse line circuit for transmission to the primary station PS where the current is received at the receiver R33 of the unit CT2 and demodulated and the tone frequency applied to the loud-speaker LS. In like manner a calling current of the high or 144 kc. channel received from the longitudinal circuit at the remote station RS is demodulated at receiver R144 and the tone frequency applied to the transmitter T39 to modulate the 39 kc. carrier and this modulated carrier current is applied to the transverse line circuit for transmission to the primary station PS where it is demodulated at receiver R39 and the calling tone applied to the loud-speaker.

To sum up, the stand-by condition of the apparatus permits either train TR1 or TR2 to call the operator at the primary station PS on either of the carrier channels. The calling current from train TR1 which is operating within the range of station PS is received through the ITC assembly of station PS and the calling current from train TR2 which is operating within the range of the remote station RS is received at station RS through the ITC assembly and transmitted from the remote station RS to the primary station through either the CT1 or the CT2 unit.

In the event a call is received at station PS the operator can determine if the call comes from train TR1 or train TR2 by operating the test switch 43. If the call continues with switch 43 open, the operator knows the call is from the remote station RS, and if it ceases with switch 43 open, the call is coming from the train TR1.

I shall next assume that the operator at the station PS desires to communicate with the train TR1 through the low 88 kc. carrier channel. To do this, the operator sets the switch TS to its right-hand or local position, and the selector switch SS to its right-hand or low carrier position. The operator then would operate the calling switch CS to the right to send the calling tone of the low carrier channel. A circuit for relay 1P is now formed from terminal B through contact 73 of switch TS, winding of relay 1P, wire 61 in cable CA5 and contact 62 of switch CS to terminal N, and relay 1P is energized to open back contact 14 and close front contact 16 so that the receiver R88 is deenergized and the transmitter TN is energized. Relay L1 is also energized by a circuit including terminal B, winding of the relay, wire 63 in cable CA5, contact 64 of switch CS and terminal N. With relay L1 picked up closing front contacts 22 and 13, the calling oscillator CO is conditioned to supply the tone frequency for the 88 kc. channel and the output of the calling oscillator is connected to the transmitter TN to modulate the 88 kc. carrier by the tone frequency. The connection for the calling oscillator to the transmitter includes wire 65 in cable CA1, contact 66 of switch TS, wire 67 in cable CA1 and the input of the transmitter. This calling current thus applied to the longitudinal line circuit is available to influence the receiver R88 of the train TR1.

Subsequent to the sending of the calling current the switch CS is restored to its normal condition so that relays 1P and L1 are deenergized and the ITC assembly is restored to its normal receiving condition. With the switches TS and SS set at their right-hand positions, the output of the receiver R88 is switched from the loud-speaker LS to the earphones of the hand set HS, the connection being completed through wire 41 in cable CA1, contact 68 of switch TS, wire 69 in cable CA2, contact 70 of switch SS and wire 71 in cable CA3 to the earphones, the other side of the circuit being completed through ground. Thus a reply from train TR1 is sounded in the earphones. The operator can receive the reply from train TR1 at the loudspeaker by setting switch SS at its stand-by position to complete the normal connection of receiver R88 to the loud-speaker.

To send from station PS during the two-way conversation with train TR1, the operator uses a press-to-talk switch 72 of the hand set. With switch 72 closed, the relay 1P is energized by current flowing from terminal B through contact 73 of switch TS, winding of relay 1P, wire 61 in cable CA5, wire 74 in cable CA6, contact 75 of switch SS, wire 76 in cable CA3, and press-to-talk switch 72 to terminal N. With relay 1P picked up to deenergize receiver R88 and energize transmitter TN, voice frequencies created by talking into a microphone M of the hand set is applied to the transmitter TN for modulating the carrier current, a microphone circuit being traced from terminal B through ground to the input of transmitter TN, wire 67 in cable CA1, contact 81 of switch TS, wire 80 in cable CA2, contact 79 of switch SS, wire 78 in cable CA3, microphone M and front contact 77 of relay 1P to terminal N.

It follows that by using the press-to-talk switch 72, the operator can carry on a two-way conversation with the train TR1 by use of the 88 kc. channel. During this conversation the receivers R144 and R39 and R33 are connected to the loud-speaker ready to receive a call, the circuit connections for receivers R39 and R33 being the same as in the stand-by condition but the connection for the receiver R144 being now completed through wire 46 in cable CA1, contact 82 of switch TS, wire 83 in cable CA2, contact 84 of switch SS and wire 45 in cable CA3 to the loud-speaker.

In the event the operator wishes to communicate with train TR1 using the 144 kc. channel, the switch TS is set at the local or right-hand position and switch SS is set at the left-hand or high channel position. The calling switch CS is moved to the left for sending a call. Relay 2P is now energized through a connection including terminal B, contact 73 of switch TS, winding of relay 2P, wire 85 in cable CA5, contact 86 of switch CS and terminal N. Relay 2P on picking up to open back contact 15 and close front contact 17 deenergizes the receiver R144 and energizes the transmitter TN. The relays L3, L2, and L1 are now all energized, the relay L3 being provided with a circuit extending from terminal B through winding of the relay, wire 87 in cable CA5 and contact 88 of switch CS to terminal N. Relay L2 is energized by current flowing from terminal B through winding of the relay, wire 89 in cable CA5, and contact 90 of switch CS to terminal N. The circuit for relay L1 includes terminal B, winding of the relay, front contact 91 of relay L2 and the circuit previously traced for relay L2. With relay L3 picked up closing front contact 20, the transmitter TN is conditioned to supply the 144 kc. carrier, and with relays L1 and L2 picked up the calling oscillator CO is conditioned to supply the tone frequency for the 144 kc. carrier and the output of the oscillator CO is coupled to the input of the transmitter so that the calling current is applied to the longitudinal line circuit and is available to influence the receiver R144 on the train.

After sending this calling current, the switch CS is restored to its center position and the operator can carry on a two-way conversation by using the press-to-talk switch 72. When the switch 72 is closed to send from the primary station, the relay 2P is energized to cut out the receiver R144 and to cut in the transmitter TN, the circuit for relay 2P being completed through contact 73 of switch TS, winding of relay 2P, wire 85 in cable CA5, wire 92 in cable CA6, contact 93 of switch SS, wire 76 in cable CA3 and switch 72 to terminal N. The relay L3 is also provided with a circuit to condition the transmitter for supplying the 144 kc. carrier, the circuit for relay L3 including terminal B, winding of relay L3, wire 87 in cable CA5, wire 94 in cable CA6, contact 95 of switch SS, wire 76 in cable CA3, switch 72 and terminal N. The earphones of the hand set are now connected to the output of the receiver R144 to receive the conversation, the connection being completed through wire 46 in cable CA1, contact 82 of switch TS, wire 83 in cable CA2, contact 96 of switch SS, wire 71 in cable CA3 and ground. The microphone is now connected to the transmitter TN through input of transmitter TN, wire 67 in cable CA1, contact 170 of switch TS, wire 141 in cable CA2, contact 140 of switch SS, wire 78 in cable CA3, microphone M, front contact 168 of relay 2P, and terminal N. During the conversation, the receivers R88, R39 and R33 are connected to the loud-speaker to receive a call, the connections for the receivers R39 and R33 being the same as under the standby condition, but the connection for receiver R88 including wire 41 in cable CA1, contact 68 of switch TS, wire 69 in cable CA2, contact 97 of switch SS and wire 45 in cable CA3.

It follows from the foregoing description that the operator can carry on a two-way conversation with train TR1 on either carrier channel through the ITC assembly of the primary station PS and during a conversation on either one or the other of the carrier channels, the receiver of the other channel and the receivers of the units CT1 and CT2 are connected to the loud-speaker so that a call can be received.

I shall next consider the operation when the operator at station PS wishes to talk to the train TR2 in the vicinity of the remote station RS, the operator carrying on the conversation by the apparatus at the remote station. Under these circumstances, the switch TS is set at its left-hand or remote position and the channel selection switch CS is set at the right-hand position if the operator desires to carry on conversation on the 88 kc. channel. Also, when the operator uses the 88 kc. channel for communication with a train, then the 33 kc. channel is used for transmission between the two stations.

To send a call on the 88 kc. channel the operator moves the calling switch CS to the right. The first thing to occur under this condition is that the two control relays G1 and G2 of the control unit CU are energized sequentially in the order named due to the construction of the contacts of the calling switch CS closing the circuit for relay G1 first. The circuit for relay G1 can be traced from terminal B through ground, winding of relay G1, wire 98 in cable CA4, contact 99 of switch TS, wire 100 in cable CA2, wire 101 in cable CA6 and contact 102 of switch CS to terminal N. The circuit for the relay G2 includes ground, winding of the relay, wire 103 in cable CA4, contact 104 of switch TS, wire 105 in cable CA2, wire 106 in cable CA6, the later closed contact 107 of switch CS and terminal N. With relays G1 and G2 energized sequentially the connections for the oscillators 34 and 35 are completed sequentially and their currents are transmitted to the remote station to energize relays K1 and K2 sequentially. The closing of contact 108 of relay K1 completes a simple circuit for the lower winding of relay SP and its polar armature is operated to the left-hand position, if it is not already in this position. The subsequent energization of the top winding of relay SP when contact 109 of relay K2 is closed does not change the position of the polar armature of relay SP due to its polar stick characteristic. Both windings of relay NP are energized with the operation of relays K1 and K2 and relay NP is picked up so that current flows from terminal B through the control relay 1P of the station RS, the connection being completed at contact 110 of relay SP and front contact 111 of relay NP. With relay 1P at station RS picked up to open its back contact 14 and close its front contact 16, the receiver R88 is deenergized and the transmitter TN is energized. Current also flows from terminal B through winding of relay L1 at station RS, contact 112 of relay SP, contact 113 of relay K2 and contact 114 of relay K1 to terminal N, and relay L1 is picked up to close its contacts 13 and 22 so that the calling oscillator CO at the station RS is conditioned to supply the tone frequency for the 88 kc. channel and there is completed a connection between the output of the calling oscillator and the input of the transmitter TN for modulating the 88 kc. carrier by the low calling tone with the result that this calling current is applied to the longitudinal line circuit at station RS and is available to influence the receiver R88 of the train TR2.

Subsequent to the sending of this calling current the operator restores the switch CS to its mid position so that the relays G1 and G2 are deenergized and the apparatus of the two stations is made ready to transmit a reply from train TR2. A reply from train TR2 will be demodulated at receiver R88 of the station RS and the voice frequencies applied to the transmitter T33 and the corresponding carrier telephone current applied to the transverse line circuit for transmission to the primary station PS. At station PS this current is demodulated at receiver R33 and applied to the earphones of the hand set, the connection of the earphones including wire 50 in cable CA4, contact 123 of switch TS, wire 124 in cable CA2, contact 125 of switch SS, wire 71 in cable CA3, earphones and ground connection. It is to be pointed out that the operator at station PS can receive the reply from train TR2 at the loud-speaker by setting switch SS at its stand-by position, the receiver R33 being then connected to the loud-speaker through contact 175 of switch SS in place of being connected to the earphone as traced above. To reply the operator uses the push-to-talk switch 72 to effect a push-to-talk control at the remote station RS. With switch 72 closed, control relay G1 is energized by current flowing through ground, winding of relay G1, wire 98 in cable CA4, contact 99 of switch TS, wire 100 in cable CA2, contact 126 of switch SS, wire 76 in cable CA3 and switch 72 to terminal N. With relay G1 picked up, the control current of frequency f1 is applied to the line circuit to reverse the polar armature of the relay K1 at station RS. The lower windings of polar stick relay SP and neutral relay NP are energized so that relay SP is held at its left-hand position and relay NP is picked up. Under these conditions the relay 1P at station RS is energized to switch the receiver R88 and the transmitter TN at that station. Also, the picking up of relay NP opening back contacts 56 and 60 removes the shunt of relays D1 and D2 and they pick up to switch the units CT1 and CT2. At station PS, a microphone circuit is formed from ground through front contact 128 of relay G1, microphone M, wire 78 in cable CA3, contact 79 of switch SS, wire 80 in cable CA2, contact 127 of switch TS, wire 126 in cable CA4, input side of the transmitter T33 and resistor 129 to terminal BA. This path through the microphone also serves to shunt the relay D2 at station PS with the result the output of the associated transmitter T33 is connected across the transverse line circuit so that the voice frequencies created in the microphone of the hand set serve to modulate the 33 kc. carrier of the transmitter T33 and the resultant carrier telephone current is transmitted to the remote station where it is received by the receiver R33 of the unit CT2 at that station and demodulated, since the input of receiver R33 at station RS is now connected to the transverse line circuit. The voice frequencies in the output of the receiver R33 at station RS are applied to the input of the transmitter TN since this connection is closed at front contact 52 of relay D2 at station RS and the corresponding modulated carrier is applied to the longitudinal line circuit and is available for influencing the train carried receiver R88. Thus by use of the press-to-talk switch 72 a corresponding press-to-talk control is effected at the remote station RS and the operator can carry on a two-way conversation with train TR2 through the ITC assembly of the remote station.

During this time the loud-speaker at the primary station is connected to the outputs of the receivers R88, R144, and R39, the connection for the receivers R88 and R144 being the same as under the stand-by condition, and the connection for the receiver R39 including wire 48 in cable CA4, contact 130 of switch TS, wire 131 in cable CA2, contact 132 of switch SS, wire 45 in cable CA3, loud-speaker, ground and front contact 32 of relay D1.

Should the operator wish to use the 144 kc. channel for communicating with the train TR2, the operation of the apparatus is similar to that just described for carrying on a conversation by use of the 88 kc. channel. This time the operator moves the switch SS to the left-hand and operates switch CS to the left energizing the two control relays G2 and G1 sequentially in the order named, the connection for relay G2 being completed at contact 133 of switch CS and the connection for the relay G1 being completed at the later operated contact 134 of switch CS.

At the remote station RS the reception first of the control current of frequency f2 energizes the relay K2 and in turn energizes the top winding of the polar stick relay SP to operate its polar contact to the right hand before current is received of the frequency f1 to operate relay K1 and energize the lower winding of relay SP. This means that relay SP is held at the right-hand position and the neutral relay NP is picked up. The relays 2P and L3 of station RS receive current through the right-hand contact 135 of relay SP and front contact 111 of relay NP. Also, the two relays L2 and L1 at station RS are provided with a circuit completed at contacts 114, 113 and 136 of relays K1, K2 and SP, respectively. This control of the relays 2P, L3, L2, and L1 at station RS deenergizes the receiver R144 and energised the tansmitter TN, the transmitter TN being conditioned to supply the 144 kc. carrier. Also, the calling oscillator CO at station RS is conditioned to supply the tone frequency for the 144 kc. carrier for modulating the output of the transmitter TN and consequently this calling current of the high carrier channel is applied to the longitudinal circuit and is available for actuating the receiver R144 of train TR2.

Two-way conversation is subsequently carried on by the operator restoring the calling switch CS to its mid position and using his push-to-talk switch 72. A reply from train TR2 in response to the calling current is received at the receiver R144 of station RS and the voice frequencies are applied to transmitter T39 so that a carrier telephone current of the 39 kc. carrier is transmitted to the primary station over the transverse line circuit and is received at receiver R39 at station PS and the message sounded in the earphone of the hand set HS since the output of the receiver R39 is now connected to the earphone through wire 48 in cable CA4, contact 130 of switch TS, wire 131 in cable CA2, contact 137 of switch SS and wire 71 in cable CA3 to the earphone. Again, it is to be pointed out that the operator can receive the reply from train TR2 at the loud-speaker by setting switch SS at its stand-by position, the receiver R39 being then connected to the loud-speaker through contact 132 of switch SS.

To reply to the train TR2 the operator closes the press-to-talk switch 72. With switch 72 closed, the relay G2 is energized through wire 103 in cable CA4, contact 104 of switch TS, wire 105 in cable CA2, contact 138 of switch SS, wire 76 in cable CA3 and contact 72 to terminal N. When the control relay G2 is picked up the control current of frequency f2 is sent to the remote station to operate relay K2 and subsequently retain relay SP at its right-hand position and energize relay NP. This means that the receiver R144 at the remote station is deenergized and the transmitter TN is energized and conditioned to transmit on the 144 kc. carrier. Also, relay D1 of unit CT1 is picked up and that unit is conditioned to receive current from the primary station. The microphone circuit is now completed from ground through front contact 139 of relay G2, microphone, wire 78 in cable CA3, contact 140 of switch SS, wire 141 in cable CA2, contact 142 of switch TS, wire 143 in cable CA4, input side of transmitter T39, and resistor 33 to terminal BA. This path also shunts the relay D1 and the relay D1 is released to connect the output of the transmitter T39 to the transverse line circuit so that voice frequencies created in the microphone and applied to the transmitter T39 cause telephone current of 39 kc. carrier to be transmitted to the remote station. At station RS this current is received at receiver R39 and demodulated and the voice frequencies are applied to the input of transmitter TN with the result that a carrier telephone current of the 144 kc. channel is applied to the longitudinal circuit to inductively influence the receiver R144 of the train TR2.

During this time, the output of the receivers R88, R144, and R33 at the primary station remain connected to the loud-speaker to receive a call. The connections for receivers R88 and R144 are the same as under the stand-by position and the circuit for receiver R33, includes wire 50 in cable CA4, contact 123 of switch TS, wire 124 in cable CA2, contact 175 of switch SS, wire 45 in cable CA3 and the loud-speaker.

Thus the operator at the station PS can carry on a conversation with the train TR2 by use of the 144 kc. carrier channel through the remote station apparatus.

Referring to Figs. 2*a* and 2*b*, the apparatus is the same as that of Figs. 1*a* and 1*b*, except for the use of a polarized line circuit to control the remote station in place of a frequency control and to use the calling oscillator at the primary station for providing a call through the remote station in place of a separate calling oscillator at the remote station.

It is believed that the apparatus of Figs. 2*a* and 2*b* can best be understood from a description of its operation taken in connection with the description of the apparatus of Figs. 1*a* and 1*b*.

Under the stand-by condition of the apparatus of Figs. 2*a* and 2*b*, the receivers R88 and R144 of the ITC assembly and the receivers R33 and R39 of the CT2 and CT1 units at the primary station PS are connected to the loud-speaker in multiple ready to receive a call from the trains operating in the stretch of track RT. At the remote station RS, the receivers R88 and R144 of the ITC assembly are conditioned for reception and the transmitters T39 and T33 of the CT1 and CT2 units are conditioned to transmit to the primary station any call received through the ITC assembly.

In the case the operator desires to communicate with train TR1 within the range of transmission of the primary station PS, he sets the switch TS at the local or right-hand position and the switch SS at the carrier channel position corresponding to the carrier channel he is going to use and then operates the calling switch CS according to the carrier channel to be used to send a call. The operation of the equipment for communication with the train TR1 is the same as described for the operation of the apparatus of Figs. 1*a* and 1*b* and the description of this portion of the operation of the apparatus of Figs. 2*a* and 2*b* need not be repeated.

I shall next take up the operation of the apparatus when the operator wishes to communicate with a train, such as train TR2, within the range of transmission of the remote station RS, and I shall assume first that the operator is using the 88 kc. carrier channel. Under these circumstances, the operator sets the switch TS at its left-hand or remote position, and switch SS at the right-hand or low channel position. To send a call, the calling switch CS is moved to the right. A control relay G3 is energized by this operation of the calling switch CS, current flowing from terminal B through contact 145 of switch TS, wire 144 in cable CA4, winding of relay G3, wire 146 in cable CA3, contact 152 of switch SS, wire 159 in cable CA6, and contact 160 of switch CS to terminal N. With relay G3 picked up, a line battery 153 has one terminal connected to the line wires L1 and L2 in multiple, through front contact 155 of relay G3 and a repeater or simplex coil 156, and its other terminal connected to ground through front contact 154 of relay G3. At station RS this control current from battery 153 is supplied to relays K3 and K4 in series through a simplex coil 157 and the current is of a polarity that the relay K3 is operated to the left-hand position, but relay K4 is energized with its polar armature held at the biased right-hand position, the relays K3 and K4 being bias polar relays.

With the control relay K3 reversed, the power control relay 1P at station RS is energized by an obvious circuit including contact 158 of relay K3 and relay 1P on picking up serves to switch the receiver R88 and transmitter TN at station RS. Also, the opening of contact 169 of relay K3 serves to remove a shunt path of relay D2 of the unit CT2 and relay D2 is picked up and the receiver R33 of that unit is connected to the transverse line circuit to receive carrier telephone current from the primary station. At the primary station PS the moving of the switch CS to the right serves to complete at its contact 64 the circuit for relay L1, and relay L1 on picking up conditions the calling oscillator CO to supply the calling tone for the 88 kc. channel. The output of the oscillator CO is now connected to the transmitter T33 at the primary station by a connection completed through wire 65 in cable CA1, contact 148 of switch TS, wire 149 in cable CA2 to a tap at the right-hand end of switch SS, contact 151 of switch SS, wire 80 in cable CA2, contact 127 of switch TS, wire 126 in cable CA4, input side of transmitter T33 and terminal BA. This path serves also to shunt the relay D2 of unit CT2 of station PS and relay D2 is released to connect the output of transmitter T33 to the transverse line circuit so that the 33 kc. carrier is modulated by the tone frequencies supplied from the oscillator CO and the calling current is transmitted to station RS where the current is received and demodulated at the receiver R33 and the tone frequencies are applied to the input of the transmitter TN of station RS to modulate the 88 kc. carrier. This results in calling current of the low channel frequency being supplied to the longitudinal circuit at station RS and made available to actuate the receiver R88 of the train TR2.

Subsequent to the sending of this calling current the operator would move the switch CS to its mid-position. This causes the control relay G3 to be deenergized and in turn the polar relay K3 of the remote station is returned to its biased position and the apparatus at the stations is ready to receive from the train. A reply from the train TR2 is received at the receiver R88 at station RS and demodulated and the voice frequencies applied to the transmitter T33 and the corresponding carrier telephone current supplied to the transverse circuit for transmission to the primary station PS where it is received at the receiver R33 and demodulated and the voice frequency sounded at the earphone of the hand set which is now connected to the output of the receiver R33, the connection being the same as described in Fig. 1*a*.

The operator uses his push-to-talk switch 72 to reply to the train TR2. The switch 72 controls the relay G3, the relay G3 being energized when switch 72 is closed, through a connection from terminal B, contact 145 of switch TS, wire 144 in cable CA4, relay G3, wire 146 in cable CA3, contact 152 of switch SS, wire 76 in cable CA3, and switch 72 to terminal N. With relay G3 energized, then the control current from battery 153 is applied to the line circuit for reversing the relay K3 at the remote station to switch the apparatus at that station. The microphone M is now connected to the input of the transmitter T33 the same as in Fig. 1*a* except to include front contact 171 of relay G3, and relay D2 of unit CT2 is shunted to connect the output of transmitter T33 to the transverse line circuit and the voice frequencies created in the microphone serve to modulate the 33 kc. carrier and the corresponding carrier telephone current is transmitted to the remote station RS. At the remote station the reversal of the polar relay K3 causes the relay 1P to be energized to switch the receiver R88 and transmitter TN, and also to switch the unit CT2 from the transmitter T33 to the receiver R33 so that the carrier telephone current now transmitted from the primary station PS is demodulated at receiver R33 and the voice frequencies are applied to the transmitter TN to modulate the 88 kc. carrier and the corresponding carrier telephone current is applied to the longitudinal circuit for transmission to the train TR2.

To use the 144 kc. carrier channel for communication with train TR2, the operator would set the switch TS for remote control and switch SS at the left for the high channel. Then to send a calling current the calling switch CS is moved to the left. This condition of the control switches serves to energize a relay G4 at the station PS, current being supplied from terminal B through contact 145 of switch TS, wire 144 in cable CA4, winding of relay G4, wire 147 in cable CA3, contact 161 of switch SS, wire 162 in cable CA6 and contact 163 of switch CS to terminal N. With relay G4 energized the control battery 153 is connected to the line circuit at a polarity the reverse of that when relay G3 was selected and the control current serves to energize the relays K3 and K4 at the remote station at a polarity such that relay K4 is reversed and relay K3 is held at its biased position. With relay K4 reversed then the relays 2P and L3 at the remote station are energized by an obvious circuit including contact 164 of relay K4 and the receiver R144 is deenergized and transmitter TN is energized and conditioned to supply the carrier of 144 kc. The opening of contact 165 of relay K4 removes the shunt circuit from relay D1 of unit CT1 of station RS and relay D1 is picked up so that the receiver R39 is connected to the transverse line circuit. At the primary station PS, movement of the switch CS to the left closes circuits for energizing relays L1 and L2 the same as in Fig. 1*a* and the calling oscillator CO is conditioned to supply the tone frequency for the 144 kc. carrier channel. The output of the oscillator CO is now connected to the input of the transmitter T39 through wire 65 in cable CA1, contact 148 of switch TS, wire 149 in cable CA2 to a tap at the left-hand end of switch SS, contact 150 of switch SS, wire 141 in cable CA2, contact 142 of switch TS, wire 143 in cable CA4, input of transmitter T39 and terminal BA. This circuit also serves to shunt the relay D1 of the unit CT1 and transmitter T39 is connected to the transverse line circuit. Thus the carrier of 39 kc. modulated by the tone frequency of oscillator CO is transmitted to station RS and there received by receiver R39 of the unit CT1 of that station. This calling current is demodulated and the tone frequency is applied to the input of transmitter TN of station RS to modulate the 144 kc. carrier and the corresponding calling current is supplied to the longitudinal line circuit for transmission to the train TR2. The operator restores the switch CS at the end of a calling period and the relay G4 is deenergized and the apparatus made ready to receive a reply from the train. The reply is picked up by the receiver R144 at station RS and demodulated. The voice frequencies are applied to the transmitter T39 of the remote station and the corresponding carrier telephone current is applied to the transverse line circuit and transmitted to the primary station where it is received and demodulated at receiver R39 of that station. The output of the receiver R39 of station PS is now connected to the earphones through wire 48 in cable CA4, contact 130 of switch TS, wire 131 in cable CA2, contact 137 of switch SS, wire 71 in cable CA3 and the earphones to ground.

In replying to the train, the operator uses the push-to-talk switch 72, which when closed completes the circuit for relay G4, current flowing from terminal B through contact 145 of switch TS, wire 144 in cable CA4, winding of relay G4, wire 147 in cable CA3, contact 161 of switch SS, wire 76 in cable CA3 and switch 72 to terminal N. With relay G4 picked up, control current of the polarity effective to reverse the relay K4 at the remote station is transmitted from battery 153 at the primary station, and with relay K4 reversed the relay D1 is picked up and the receiver R39 at the remote station is connected to the transverse line circuit. Also the receiver R144 at station RS is deenergized and transmitter TN is energized and conditioned to supply the 144 kc. carrier.

At the primary station the microphone M is provided with a circuit including ground, front contact 166 of relay G4, microphone M, wire 78 in cable CA3, contact 140 of switch SS, wire 141 in cable CA2, contact 142 of switch TS, wire 143 in cable CA4, input of transmitter T39, and terminal BA. This path also serves to shunt the relay D1 and relay D1 is released so that the output of the transmitter T39 is connected to the transverse line circuit. Thus carrier telephone current of 39 kc. carrier is transmitted to the remote station RS where it is received and demodulated at receiver R39 and the voice frequency supplied to the transmitter TN with the result that carrier telephone current of the 144 kc. channel is supplied to the longitudinal circuit for transmission to the train TR2.

It follows from the foregoing description of Figs. 2*a* and 2*b* that the operator can carry on a two-way conversation with trains within the range of transmission of the remote station, either carrier channel being used, the operator effecting a push-to-talk control of the remote station by means of a polar line circuit.

It is to be pointed out that at the primary station the loud-speaker remains connected to the receivers not used during a conversation so that an emergency call can be received.

Although I have herein shown and described but two forms of carrier inductive communication system for vehicles embodying my invention, it is understood that various changes and modifications may be made therein within the scope of the appended claims without departing from the spirit and scope of my invention.

Having thus described my invention, what I claim is:

1. In a system for communication between an office and a vehicle moving over a stretch of trackway remote from the office, the combination comprising, an office, a stretch of trackway, a wayside station along the stretch, telephone equipment at the station, said equipment including a transmitter having a modulator and a receiver having a demodulator and which equipment uses a carrier of a given frequency for two-way transmission by electromagnetic induction on a push-to-talk basis, carrier telephone units one at the office and one at the station, each said unit including a transmitter having a modulator and a receiver having a demodulator and which units use a carrier of a frequency different from said given frequency, a line circuit between said office and station, each said unit having connections to selectively connect the output of its transmitter and the input of its receiver to said line circuit for two-way transmission between the office and station on a push-to-talk basis, said station unit having connections to couple the input of its transmitter and the output of its receiver to the output of the receiver and the input of the transmitter respectively of said station telephone equipment, a telephone set at said office having connections to the input of the transmitter and the output of the receiver of said office telephone unit; control means including a push-to-talk switch at the office, a line circuit between the office and station and control relays one at the office and one at the station; said relays being operated to different positions in response to operation of said push-to-talk switch, said office relay having contacts operable to govern said connections of said office unit to the first mentioned line circuit, and said station relay having contacts operable to govern said connections of said station unit to the first mentioned line circuit and to selectively activate the transmitter and receiver of said station telephone equipment.

2. In a system for communication between an office and a vehicle moving over a stretch of trackway remote from the office, the combination comprising, a stretch of trackway, an office, a station along said stretch, telephone equipment at the station, said equipment including a transmitter having a modulator and a receiver having a demodulator and which equipment uses a carrier of a given frequency for two-way transmission on a push-to-talk basis, carrier telephone units one at the office and one at the station, each said unit including a transmitter having a modulator and a receiver having a demodulator and which units use a carrier of a frequency different from said given frequency for two-way transmission between said office and station on a push-to-talk basis, said station unit having connections to couple the input of its transmitter and the output of its receiver to the output of the receiver and the input of the transmitter respectively of said station telephone equipment, a telephone set at said office having connections to the input of the transmitter and the output of the receiver of said office telephone unit; control means including a push-to-talk switch at the office, a line circuit between the office and station and control relays one at the office and one at the station; said control relays being operated to different positions according to the position of said push-to-talk switch, circuit means including a contact of each of said control relays to alternately couple the output of the transmitter and the input of the receiver of said office telephone unit to the input of the receiver and the output of the transmitter respectively of said station telephone unit in response to operation of the push-to-talk switch, and other circuit means including a contact of said station relay to alternately activate said transmitter and receiver of said station telephone equipment in response to operation of the push-to-talk switch.

3. In a system for communication between an office and a vehicle moving over a stretch of trackway and which stretch is greater than the effective range of transmission of the system, the combination comprising, an office, a stretch of trackway, a wayside station located along the stretch remote from said office; telephone equipments one at said office and one at said station; each said equipment including a transmitter having a modulator and a receiver having a demodulator and which equipments use a given carrier frequency for two-way transmission by electromagnetic induction on a push-to-talk basis, carrier telephone units one at the office and one at the station, each said unit including a transmitter having a modulator and a receiver having a demodulator and which units use a carrier frequency different from said given frequency for two-way transmission between the office and the station on a push-to-talk basis, said station unit having connections to couple the input of its transmitter and the output of its receiver to the output of the receiver and the input of the transmitter respectively of said station telephone equipment, a telephone set at the office, switching means at the office operable to a first and a second position, means including contacts of the switching means to connect said telephone set to the office telephone equipment or to the office telephone unit according as the switching means is operated to its first or second position; control means including a push-to-talk button at the office, a line circuit between the office and station and three control relays of which relays a first and a second one are at the office and a third one is at the station; said push-to-talk button being operable to control either said first relay or to control said second and third relays according as said switching means is operated to its first or second position, means including a contact governed by said first relay to alternately activate the transmitter and receiver of said office telephone equipment in response to operation of the push-to-talk button, and means including contacts governed by said second and third relays to alternately couple the transmitter and receiver of the office telephone unit to the receiver and transmitter respectively of the station telephone unit and to alternately activate the transmitter and receiver of the station telephone equipment in response to operation of the push-to-talk button.

4. In combination, an office and a station spaced apart, line wires extending between said office and station, a longitudinal line circuit including said line wires in multiple and a ground return path, a transverse line circuit including said line wires in series, a first and a second carrier converting means at said station, said first means including means which are operable for converting a carrier telephone current of a given first carrier frequency into a carrier telephone current of a given second carrier frequency, said second means including means which are operable for converting a carrier telephone current of said second carrier frequency into carrier telephone current of said first carrier frequency, circuit means at said station to connect the input and the output of said first and second converting means respectively to said transverse line circuit, other circuit means at said station to connect the output and the input of said first and second converting means respectively to said longitudinal line circuit, a carrier telephone unit including a receiver having a demodulator and a transmitter having a modulator at said office and which receiver and transmitter use said given first carrier frequency, circuit connections whereby the input of said office receiver and the output of said office transmitter are connected to said transverse line circuit, a telephone set at said office having connections to the input and the output of said office transmitter and receiver respectively, a push-to-talk device and a source of control current at said office, said control source supplying current different from said first and second carrier and having connections to said line wires, a control relay means at said station connected to said line wires by means whereby the control relay means is responsive only to current of the control source, means including contacts controlled by said push-to-talk device to govern the supplying of current by said control source and the energizing of said office receiver and transmitter, and means including contacts controlled by said relay means to govern the energizing of said first and second converting means.

5. In combination, a primary and a secondary station, a pair of line wires, a transverse circuit including said line wires in series, a longitudinal circuit including said line wires in multiple and a common return path, a carrier telephone equipment at said secondary station including a transmitter having a modulator and a receiver having a demodulator, said equipment adapted to use a carrier of a given frequency and provided with connections to couple the input of its receiver and the output of its transmitter to said longitudinal circuit, carrier telephone units one at each said primary and secondary stations, each said unit including a transmitter having a modulator and a receiver having a demodulator and adapted to use a carrier having a selected frequency different from said given frequency, a telephone hand set at said primary station having an earphone and a microphone which are connected to the output of the receiver and the input of the transmitter respectively of said telephone unit of the primary station, circuit means to couple the output of the receiver and the input of the transmitter of said telephone unit at the secondary station to the input of the transmitter and the output of the receiver respectively of said telephone equipment, a first and a second control relay, a control current source at said primary station adapted to supply current of a selected frequency different from either of said carrier frequencies and having connections to said transverse circuit, means including a filler adapted to pass said control current to connect said second control relay to said transverse circuit, means including a contact of said first control relay to selectively connect either output of the transmitter or the input of the receiver of said telephone unit at said primary station to said transverse circuit, means including a contact of said second control relay to selectively connect the input of the receiver and the output of the transmitter of said telephone unit at said secondary station to said transverse circuit and to selectively activate either the receiver or the transmitter of said telephone equipment, a push-to-talk device, and a circuit including said push-to-talk device to at times energize said first control relay.

6. In combination, a primary and a secondary station, a pair of line wires, a transverse circuit including said line wires in series, a longitudinal circuit including said line wires in multiple and a common return path, a carrier telephone equipment at said secondary station including a transmitter having a modulator and a receiver having a demodulator, said equipment adapted to use a carrier of a given frequency and provided with connections to couple the input of its receiver and the output of its transmitter to said longitudinal circuit, carrier telephone units one at each said primary and secondary stations, each said unit including a transmitter having a modulator and a receiver having a demodulator and adapted to use a carrier having a selected frequency different from said given frequency, a telephone hand set at said primary station having an earphone and a microphone which are connected to the output of the receiver and the input of the transmitter respectively of said telephone unit of the primary station, circuit means to couple the output of the receiver and the input of the transmitter of said telephone unit at the secondary station to the input of the transmitter and the output of the receiver respectively of said telephone equipment, a first control relay at the primary station, a polar control relay at said secondary station, a control source of direct current, repeater coils one at each of said stations, means including a first one of said coils and contacts of said first relay to reversibly connect said direct current source between said line wires in multiple and ground, means including a second one of said coils to connect said polar relay between said line wires in multiple and ground, means including a contact of said first control relay to selectively connect either the output of the transmitter or the input of the receiver of the telephone unit of the primary station to said transverse circuit; means including contacts of said polar relay to selectively connect either the input of the receiver or the output of the transmitter of the telephone unit of the secondary station to said transverse circuit and to selectively activate either the receiver or the transmitter of said telephone equipment, a push-to-talk device, and a circuit including said push-to-talk device to at times energize said first control relay.

ELBERT W. MARLOWE.

REFERENCES CITED

The following references are of record in the file of this patent:

UNITED STATES PATENTS

| Number | Name | Date |
|---|---|---|
| 1,453,387 | Espenschied et al. | May 1, 1923 |
| 2,393,291 | Clark | Jan. 22, 1946 |
| 2,398,741 | Halstead | Apr. 16, 1946 |